United States Patent
Morinaga et al.

[11] 3,955,273
[45] May 11, 1976

[54] METHOD OF MANUFACTURING FLAT TYPE WOUND ARMATURES

[75] Inventors: Shigeki Morinaga; Kazuo Onishi; Toshimi Abukawa; Syoichi Kawamata, all of Hitachi, Japan

[73] Assignee: Hitachi, Ltd., Japan

[22] Filed: Jan. 31, 1975

[21] Appl. No.: 546,150

[30] Foreign Application Priority Data
Feb. 1, 1974  Japan .................. 49-12784

[52] U.S. Cl. .................. 29/597; 29/205 D; 29/598; 310/43; 310/268
[51] Int. Cl.² .................. H01R 43/06
[58] Field of Search ......... 29/597, 598, 605, 205 D; 310/266, 268, 43

[56] References Cited
UNITED STATES PATENTS

| 3,524,250 | 8/1970 | Burr | 29/597 |
| 3,831,267 | 8/1974 | Onishi | 29/598 |
| 3,863,336 | 2/1975 | Noto | 29/597 |
| 3,871,070 | 3/1975 | Kazansky | 29/598 |

*Primary Examiner*—Carl E. Hall
*Attorney, Agent, or Firm*—Craig & Antonelli

[57] ABSTRACT

A flat armature is manufactured by forming a given number of coils over a separatable winding frame, fixing their relative positions by putting adhesive tapes across the coils on the frame, removing the coils from the frame, arranging a group of coils on a plane so that it will form a ring configuration, equipping the coils with a commutator, and moulding the coils equipped with the commutator with resin.

6 Claims, 5 Drawing Figures

METHOD OF MANUFACTURING FLAT TYPE WOUND ARMATURES

BACKGROUND OF THE INVENTION

This invention relates to a method of manufacturing armature windings of flat motors which are used for industrial sewing machines, car-cooler blowers, electric motors in wheels of electric cars and the like. This type of flat-motor armature is produced most commonly through the printed board method which provides a conductor coil pattern by the shielded plate method employing the printed circuit technique or by the corrosion or etching method, and through the winding method which provides coils by the single winding method or the composite winding method. This invention specifically relates to a method of manufacturing this type of armature by means of the latter winding technique.

The well-known manufacturing process based on the conventional winding method is to wind a single conductor toroidally around a plastic ring-shape plate by using a winding machine as described in U.S. Pat. No. 3,431,638 or to wind a single conductor by using a winding machine while hooking it around a pin projecting from a flat base as disclosed in U.S. Pat. No. 3,678,314.

Proposed in the U.S. Pat. No. 3,678,314 and Japanese Pat. Application Laid-Open No. 31,102/1972 is the so-called "composite winding method" which moulds some coils arranged in a ring configuration with the aid of resin.

Since the single winding method requires extremely complicated movements of a winding machine when winding, the control of the winding machine becomes extremely complex, resulting in a large-scale mechanization.

On the other hand, the composite winding method is far simpler for winding work than the single winding method and the conventional winder can be used therein. Despite this advantage, the composite winding method had difficulties with arranging coils in regular orders so that they will be electrically equivalent to each other, and consequently the mechanization was difficult.

SUMMARY OF THE INVENTION

A principal object of this invention is to eliminate these disadvantages and to provide a simple manufacturing method of flat type wound armatures. The manufacturing method according to the invention is featured by preparing a winding frame having slits and winding guides alternately arranged in regular order, forming coils by winding conductors in the slits of the frame, maintaining the relative positions of the coils thereacross, removing a group of the coils from the winding frame, arranging the group of coils on a plane so that it will form a ring configuration, locking temporarily the coils in this configuration, attaching a commutator to the group of coils in the ring configuration to form an armature winding structure, and moulding or encapsulating the structure with resin.

DESCRIPTION OF THE PREFERRED EMBODIMENTS

Figure 2:
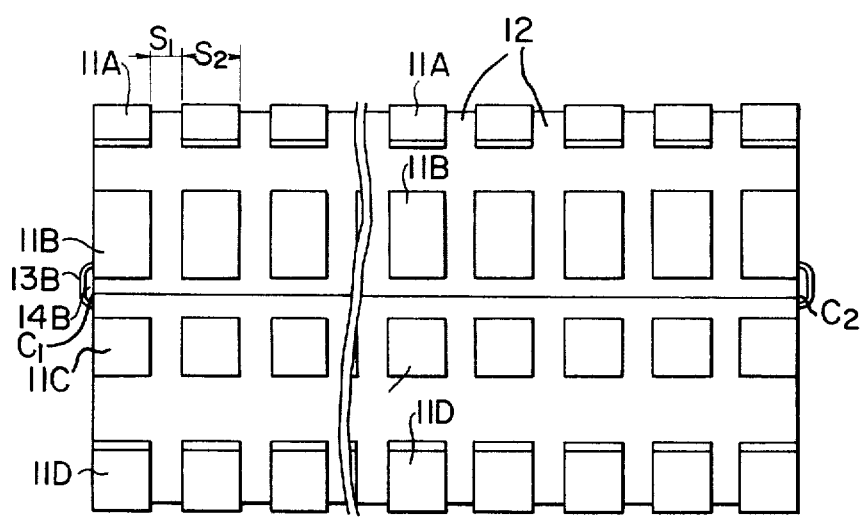
FIG. 2 is a side view thereof.
Figure 1A:
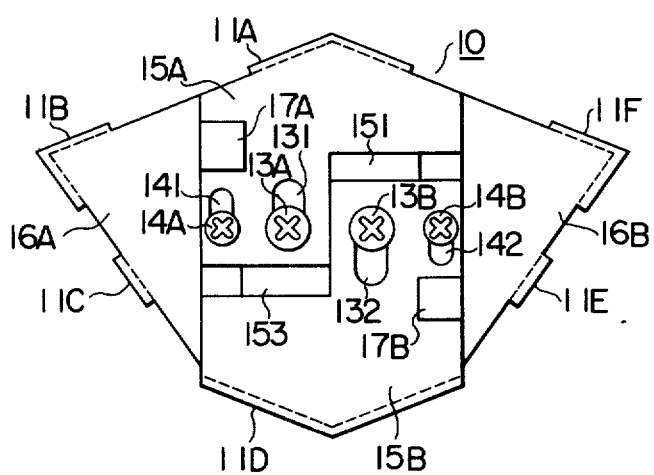
FIG. 1a is a front view of a winding frame used for manufacturing a flat type wound armature embodying the invention.
Figure 1B:
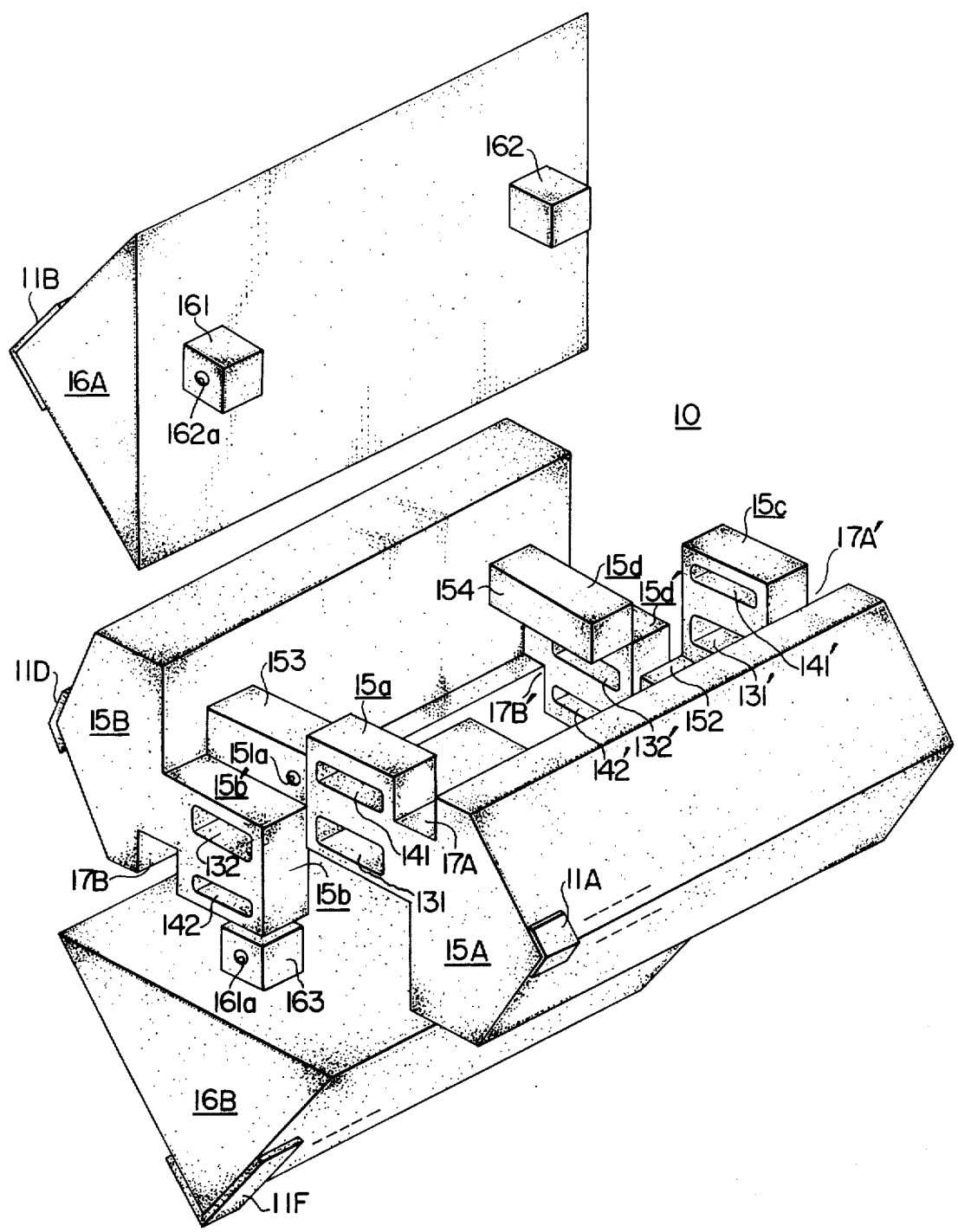
FIG. 1b is a perspective view of the frame shown in FIG. 1 in a disassembled state.

FIGS. 1a, 1b and 2 show a winding frame required for embodying the invention; as shown therein, the winding frame 10 is a hexagonal column, around which winding guides 11 comprising winding guide pieces 11A to 11F and correspondingly defined slits are alternately arranged in regular order in rows and columns as shown in FIG. 2. Within each of the slits 12 is wound by one coil composing an armature. One winding frame 10 is provided with slits 12 and corresponding guides 11 the number of which is sufficient to produce coils for at least one armature.

On the other hand, the winding frame 10 comprises assemblies 15A – 15B and 16A – 16B. If the bolts 13A – 13B and 14A – 14B shown in FIG. 1a are loosened, the assemblies 15A – 15B shrink vertically. Furthermore, the assemblies 15A – 15B are detached by guides 17A and 17B from the assemblies 16A – 16B. Concurrently, the assemblies shrink horizontally.

The coils which have been formed by winding conductors in the slits 12 of the winding frame 10 can be readily removed from the winding frame without being deformed.

In FIG. 1b illustrating the frame disassembled, projections 161 and 162 of the assembly 16A and projections 163 and 164 (not shown) of the assembly 16B are adapted to be guided along the guides (or slots) 17A and 17B to be finally positioned on the interior faces of heads 15a and 15c respectively so that slender holes 141 through the head 15a, 141' through the head 15c, 142 through the head 15b and 142' through the head 15d are in register with tapped holes 162a and 161a. Therefore, the assemblies 16A and 15A and assemblies 16B and 15B are adapted to be fixed to each other by bolts 14A and 14B to be set through the holes 141, 141' and 142, 142' registered with the tapped holes 162a and 161a. Meanwhile, the heads 15a and 15c of the assembly 15A are adapted to be fitted to cutouts 15b' and 15d' in projections 153 and 154 of the assembly 15B so that projections 151 (not shown) and 152 are positioned on the interior faces of the heads 15b and 15d. Therefore, the assemblies 15A and 15B are adapted to be fixed to each other by bolts 13A and 13b to be set through slender holes 131, 131' and 132, 132' registered with tapped holes 15a – 15d.

The formation of an armature winding with the aid of the above winding frame will be described below.

Figure 3:
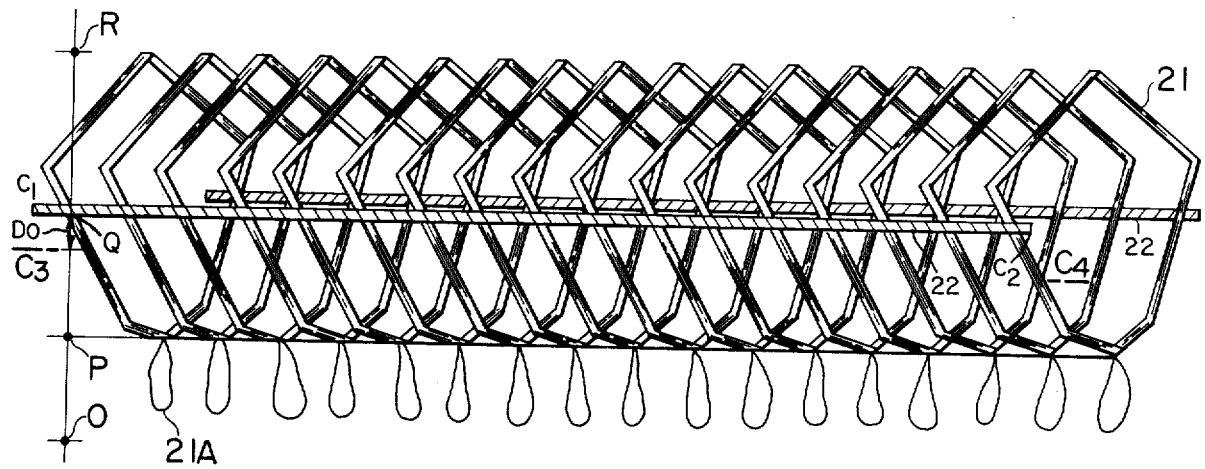
FIG. 3 is a perspective view of a group of coils for a flat type wound armature embodying the invention.

After the assemblies 15A – 15B and 16A – 16B are combined, a set of coils for one armature is formed by winding conductors in several slits 12 of the winding frame 10 which is locked in shape by the bolts 13A – 13B and 14A – 14B, and then adhesive tapes 22 are applied along line $C_1 - C_2$ as shown in FIG. 3 to maintain the relative positions of the coils with respect to one another.

Then, when the winding frame 10 is disassembled with the adhesive tapes 22 remaining fixed to the coils, and the coils are removed from the frame 10, the group of coils is formed into a configuration as shown in FIG.

3. Numeral 21 is one of the coils and 21A is both the starting and finishing ends of a coil.

In case where one conductor is successively wound around the winding frame, the ends 21A of the conductor are coupled with a hook (not shown), after a given number of turns has been wound in a slit, to give a twist to both ends of the conductor at the roots and to guide the conductor to the next slit.

Where an independent conductor is wound around each slit, the conductor is cut a little longer after a given number of turns has been wound in each slit and both ends of the conductor are given a twist at the roots. Since the ends 21A are used later for a connection to a commutator, a distinction must be made between the starting and finishing ends of the conductor.

Figure 4:
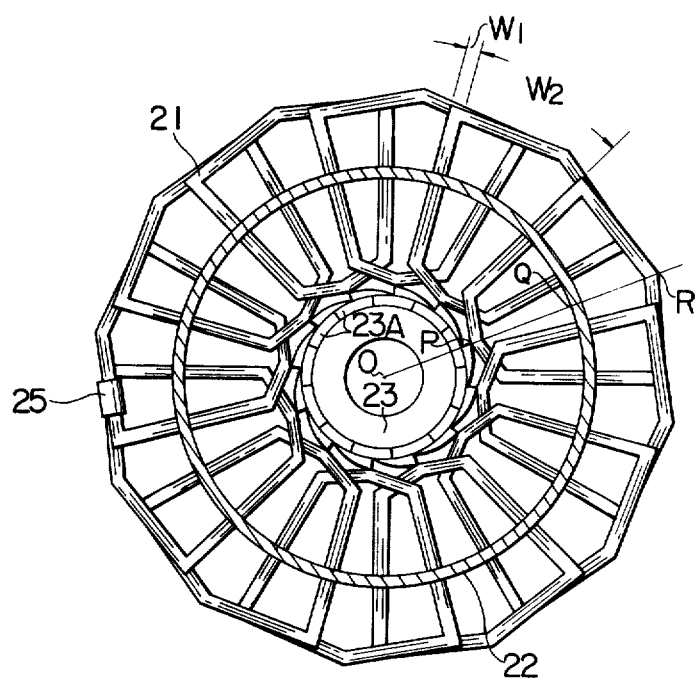
FIG. 4 is a pictorial representation of a completed flat type wound armature embodying the invention.

Next, the coils 21 are arranged flatly in a ring configuration, and sides thereof are placed together at the center with the adhesive tapes as the fulcrums, and an armature winding pattern is completed as shown in FIG. 4.

The group of coils is locked together temporarily in the ring configuration by resin pipes 25 having a C-shaped section to maintain their relative positions, a commutator 23 is installed in the central space, and the ends of the coils are cut away to be connected separately to terminals 23A of the commutator 23. Thereafter, an armature is formed by moulding or encapsulating the coils together with the commutator with the aid of resin. A vinyl tape may be used in place of the resin pipe 25. Resin pipe and/or vinyl tape harmonizes well with the moulding resin during the ultimate moulding process so that no cavity will be created in the mould.

An armature thus formed will be described hereunder in detail.

In the armature, the winding width $W_1$ of the coil and the space $W_2$ between adjoining coils are determined by the winding frame slit width $S_1$ and the winding guide width $S_2$, respectively. Therefore, if the slit width is equal to the winding guide width, the winding can be arranged fully or without any wasted space within a ring-shape flat area. Practically, however, the space among the windings nearer the center gets narrower when the coils have been spread in a ring configuration. Consequently, if the slit width and the winding guide width are equal, the edges of the adjacent coils overlap with each other, which causes an electrical loss. Therefore, particular consideration should be taken into in designing the slit width and the winding guide width so that the edges of coils, even at a section with the minimum space, will not overlap with each other when the coils have been spread in the ring configuration.

Even though armatures are formed with the same number of coils, the diameter of the armatures varies with the positions at which the adhesive tapes are applied. Since the adhesive tapes are located on line $C_1 - C_2$ on the coils as shown in FIG. 3, the distances from the commutator center to the outermost edge R and the innermost edge P are $\overline{OR}$ and $\overline{OP}$, respectively as shown in FIG. 4. But if the adhesive tapes 22 are placed on line $C_3 - C_4$ in FIG. 3, the distances are increased by a positional difference $D_0$ of the tapes. As a result, the overall diameter and the commutator diameter increase.

Such being the case, a desired armature can be easily manufactured by determining in view of the above-mentioned points the shape of the winding frame, sizes of all components, positions of adhesive tapes depending upon the intended usage, performance and shape.

As described above, this invention secures a stable armature performance and simplified manufacture of the armature since a winding frame is prepared which is provided with the slits and winding guides alternately arranged in regular order; coils are formed by winding conductors around the slits; means is provided for maintaining the relative positions of the coils; the group of coils is removed from the winding frame; the group is arranged in a plane and formed into a ring configuration; and after being temporarily locked in this configuration, the group is equipped with a commutator and moulded into the configuration with resin, whereby the relative positions of the coils never change when the coils are spread in the ring configuration, giving rise to a highly accurate production of the armature winding.

The conventional composite winding method was to manufacture coils individually and arrange the coils at given intervals on a plane so that they would take a ring configuration. Accordingly, it was very difficult to arrange the coils at equal intervals and in the ring configuration without any accurate positioning means. It often happened that the positions of coils were disturbed by touching them by accident during the work. Thus, not only the work encountered many difficulties but also accurately equal intervals could hardly be obtained. Consequently, the armatures thus produced were not equal nor satisfactory in performance.

In contrast, this invention contemplates to determine and fix the intervals of coils upon the winding frame. Therefore, the coils automatically maintain accurately equal intervals therebetween when they are arranged in a ring configuration, thereby simplifying the work. Also, armatures having a constantly high performance can be produced.

The conventional single winding method was to wind conductors, by a winding machine, around a number of pins disposed on a base at narrow intervals. In comparison with the conventional method, in accordance with the invention, the winding work is simpler, the work efficiency is higher and the controlling of a winder is easier because conductors may be wound around slits on a large hexagonal column.

Further, in accordance with the invention, an auxiliary advantage is obtained that the models can be easily changed because the diameters of an armature and commutator can be changed according to the positions of adhesive tapes which maintain the relative positions between the coils.

Further, this invention has another auxiliary advantage that the winding work is almost the same as that for the conventional induction motors and the conventional winding machine can be used with reduction in cost for equipment.

Furthermore, an extra auxiliary advantage of the invention is that the winding work is simpler than that of the conventional single winding method, the controlling of the winding machine is easier and the work efficiency is higher.

If a self-bonding wire is used in embodying the invention, the conductors inside the coils are adhered to each other so that the winding will never comes loose.

Even in a case of the ordinary conductors, they will never come loose if an adhesive tape is placed with its sticky surface upward upon the slits of the winding frame before winding the slits and the coils are bundled by the tape after completing the winding.

It should be noted that in accordance with the invention, the means for maintaining the relative positions of coils upon the winding frame is not limited to an adhesive tape as in the foregoing embodiment, but may resort to a thermal plastic resin rod for heattreatment. The winding frame is also not limited to the one as in the embodiment, but a winding frame so contrived that its coils are detachable may be used.

Preferably, one or two tapes are required to maintain the relative positions of coils. One of the tapes should be placed in parallel to the center axis of the winding frame and the other should be located opposite to the first tape, also in parallel to the center axis.

Unless the tapes are in parallel to the center axis, the extending angle of coils with respect to the center of respective coils becomes so irregular that an exact ring configuration cannot be obtained when the coils are arranged on a plane. If the two tapes are not symmetric, one of the tapes may bend to disturb a free flow of resin when moulding, resulting in an inadequate mould.

We claim:

1. A method of manufacturing a flat type wound armature having a ring-shaped coil assembly comprising the steps of:
    preparing a cylindrical winding frame, said cylindrical winding frame being capable of being disassembled and having guide pieces arranged in rows and columns on the peripheral surface of the winding frame to define annular slits and longitudinal spacings between adjacent ones of said guide pieces;
    winding insulated conductors in each of said annular slits of said frame to form equally spaced coils at each slit;
    applying a thin, flexible insulating member to secure said coils with one another to maintain the distance between identical portions of adjacent ones of said coils and to define the size of the ring-shaped coil assembly, said distance being parallel with the central axis of said cylindrical frame;
    removing said secured coils from said frame by disassembling the latter;
    flattening said secured coils with said distance between said adjacent coils being maintained without changing the shape of each coil, thereby forming a strip of a flat coil assembly;
    transforming said flat coil assembly strip into a planar ring shape with said distance being maintained, such that said coils are annularly equally spaced from and partially equally overlapped with adjacent ones of said coils; and
    joining the ring shape coil assembly with the coils at the ends of said coil assembly being joined by an insulator to have a mutual arrangement identical to that of other adjacent two coils of said ring shape coil assembly.

2. The manufacturing method according to claim 1 wherein said conductors for forming said armature comprise self-bonding wires.

3. The manufacturing method according to claim 1, wherein said insulator includes a thermoplastic or thermosetting resin pipe having a C-shaped section.

4. The manufacturing method according to claim 1, wherein said flexible insulating member for securing said coils with one another includes adhesive tapes.

5. The manufacturing method according to claim 4, wherein said adhesive tapes are a pair of adhesive tapes applied symetrically with each other on opposite sides of the plane of said flat coil assembly.

6. A method of manufacturing a flat type wound armature with a ring shaped coil assembly comprising the steps of
    winding a plurality of separated coils on a longitudinally extending winding frame;
    securing said plurality of separated coils together to maintain a fixed separation between adjacent coils, said fixed separation defined by said winding frame;
    removing said plurality of separated coils from said winding frame, thereby providing a longitudinally extending, coil-spring-like coil assembly;
    shaping said coil-spring-like coil assembly into a flattened, longitudinally extending strip-like coil assembly;
    bending said flattened coil assembly about one longitudinally extending edge of said strip-like coil assembly, thereby forming a planar coil assembly having a ring configuration;
    forming a ring armature structure by securing a commutator to said coil assembly having said ring configuration; and
    encapsulating said ring armature structure in a resin.

* * * * *